US007050416B2

(12) United States Patent
Bichot et al.

(10) Patent No.: US 7,050,416 B2
(45) Date of Patent: May 23, 2006

(54) TECHNIQUE FOR IP COMMUNICATION AMONG WIRELESS DEVICES

(75) Inventors: Guillaume Bichot, Princeton, NJ (US); Shaily Verma, Monmouth Junction, NJ (US); Junbiao Zhang, Bridgewater, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 38 days.

(21) Appl. No.: 10/144,878

(22) Filed: May 14, 2002

(65) Prior Publication Data

US 2003/0214929 A1 Nov. 20, 2003

(51) Int. Cl.
*H04L 12/66* (2006.01)
*H04Q 7/24* (2006.01)
*H04Q 1/00* (2006.01)

(52) U.S. Cl. ............... 370/338; 370/349; 370/395.52; 370/401; 455/433; 455/438

(58) Field of Classification Search ............... 370/328, 370/331, 389, 392, 395.52, 340, 395.3, 401; 455/438, 440, 445, 417
See application file for complete search history.

(56) References Cited

U.S. PATENT DOCUMENTS

| | | | | |
|---|---|---|---|---|
| 6,377,161 B1* | 4/2002 | Gromelski et al. | ......... | 455/458 |
| 6,487,605 B1* | 11/2002 | Leung | ......................... | 370/331 |
| 6,842,615 B1* | 1/2005 | Angin | ...................... | 455/432.1 |
| 2001/0014085 A1* | 8/2001 | Johansson et al. | .......... | 370/329 |
| 2001/0019544 A1* | 9/2001 | Bakke et al. | ................ | 370/331 |
| 2001/0050908 A1* | 12/2001 | Verkama | ...................... | 370/329 |
| 2002/0021689 A1* | 2/2002 | Robbins et al. | ............. | 370/352 |
| 2002/0049059 A1* | 4/2002 | Soininen et al. | ............ | 455/439 |
| 2003/0043762 A1* | 3/2003 | Pang et al. | .................. | 370/328 |
| 2003/0108014 A1* | 6/2003 | Newberg et al. | ............ | 370/338 |
| 2003/0198211 A1* | 10/2003 | Tsao | ............................ | 370/349 |
| 2004/0037242 A1* | 2/2004 | Shi et al. | ..................... | 370/329 |

OTHER PUBLICATIONS

Tsao, Shiao-Li et al., "Performance Improvement of GPRS/UMTS Core Network," Mobile Computing 2002: The 8th Mobile Computing Workshop, Mar. 22, 2002, p. 97-103.*

* cited by examiner

*Primary Examiner*—Alpus H. Hsu
*Assistant Examiner*—Justin M. Philpott
(74) *Attorney, Agent, or Firm*—Joseph J. Laks; Robert B. Levy; Jorge Tony Villabon

(57) ABSTRACT

A General Packet Radio Service (GPRS) network ($14_1$) includes at least one, and preferably, a plurality of radio access networks ($16_1$–$16_m$), each providing radio access to one or more mobile terminal users ($12_1$–$12_n$). Associated with one or more of the access networks is a corresponding one of a plurality of Serving GPRS Service Nodes (SGSNs) ($24_1$–$24_m$), each node serving to identify and authenticate a mobile terminal user. Advantageously, each SGSN also serves to cache IP packets from a sending mobile terminal user and to examine each packet to determine if the destination IP address corresponds to another mobile terminal user in the network. If so, then that SGSN routes the packet to the destination mobile terminal user. Otherwise, if the packet destination lies outside the network, the SGSN routes the packet to a gateway (32) for routing beyond the network.

11 Claims, 3 Drawing Sheets

TECHNIQUE FOR IP COMMUNICATION AMONG WIRELESS DEVICES

TECHNICAL FIELD

This invention relates to a technique for efficiently communicating IP packets among mobile terminals users served by wireless network.

BACKGROUND ART

Wireless telecommunications service continues to evolve over time. When first introduced, wireless service employed analog radio technology that allowed users to send and receive voice calls. Most wireless service providers now employ digital communications technology to allow users to communicate both voice and data. In an effort to advance the state of wireless communications, a consortium of wireless service providers and equipment manufacturers has proposed a new specification for a wireless network architecture, known as the "Universal Mobile Telephone System" (UMTS) that affords broadband, packet-based communication of text, data and even multimedia services at relatively high speeds. Document 3GPP TS 23.101 V4.0.0 (2001-04) published by the 3d Generation Partnership Project (3GPP), Sophia Antipolis, Valbone, France, and known to those skilled in the art as the UMTS specification, represents an advance over the Global Standard for Mobile (GSM), a wireless telecommunication standard used throughout the world.

The UMTS specification proposes a core network that includes a circuit switched domain for providing voice service and packet-switched domain for providing General Packet Radio Service (GPRS). Packets enter and exit the packet domain, via one of a plurality of radio access networks. Each radio access network includes one or more wireless base stations managed by a radio network controller (RNC). Within the packet domain, each of a plurality of Serving GPRS Service Nodes (SGSN) controls access to a core network from a corresponding one of the radio access networks by identifying and authenticating the mobile terminal users seeking to send and receive packet data. After identifying and validating a mobile terminal user, the SGSN establishes a link to a Gateway GPRS Service Node (GGSN). To the extent that the mobile terminal user requires an IP address, as occurs when the mobile terminal user first accesses the network, the GGSN will assign such an address. For mobile terminal users that already have an assigned IP address, the GGSN will act as a server to route communications between the mobile terminal user and an external network to which the user has sought access.

Under the presently proposed UMTS standard, a mobile terminal user seeking to exchange packets with another mobile terminal served by the same or a different access network always must establish a relationship with the GGSN in the user's packet domain since the GGSN has the responsibility of routing IP traffic between mobile terminal users. Thus, all packet communications among two or more users, especially those in a common packet domain, (i.e., a common Public Land Mobile Network), occurs through the GGSN, even if the users do not need access to an external IP network. Accordingly, packet communications among mobile terminals users will likely place a burden on the GGSN, leading to inefficiency. General Packet Radio Service implemented within a GSM network in accordance with the GSM/GPRS 2.5G standard utilizes an architecture similar to that proposed for UMTS, and thus likewise suffers from the same inefficiency.

Thus, there is a need for technique for efficiently communicating packets among mobile terminal users that overcomes the disadvantages of the prior art.

BRIEF SUMMARY OF THE INVENTION

Briefly, in accordance with a preferred embodiment, there is provided a method for communicating at least one IP packet from one mobile terminal user to another in a packet radio service network, such as a General Packet Radio Service (GPRS) network. The method commences upon receipt of a packet at a service node in the network sent by a first mobile terminal user. In practice, the service node takes the form of a Serving GPRS Service Node (SGSN) that identifies and authenticates mobile terminal users. Following receipt of the packet, the service node examines the destination IP address contained in the packet to determine whether the address identifies any of the mobile terminal users served by the network. If so, then the service node routes the packet to the identified mobile terminal user destined to receive the packet.

The above-described method achieves greater efficiency by obviating the need to uniformly route packets from the service node to a gateway for evaluation of the IP packet address and for ultimate routing to a recipient mobile terminal user. Only if the packet is not destined for any of the mobile terminal users in the network does the service node route the packet to the gateway. The above-described method reduces the load on the gateway because the gateway only receives packets destined beyond the network.

DETAILED DESCRIPTION

Figure 1:
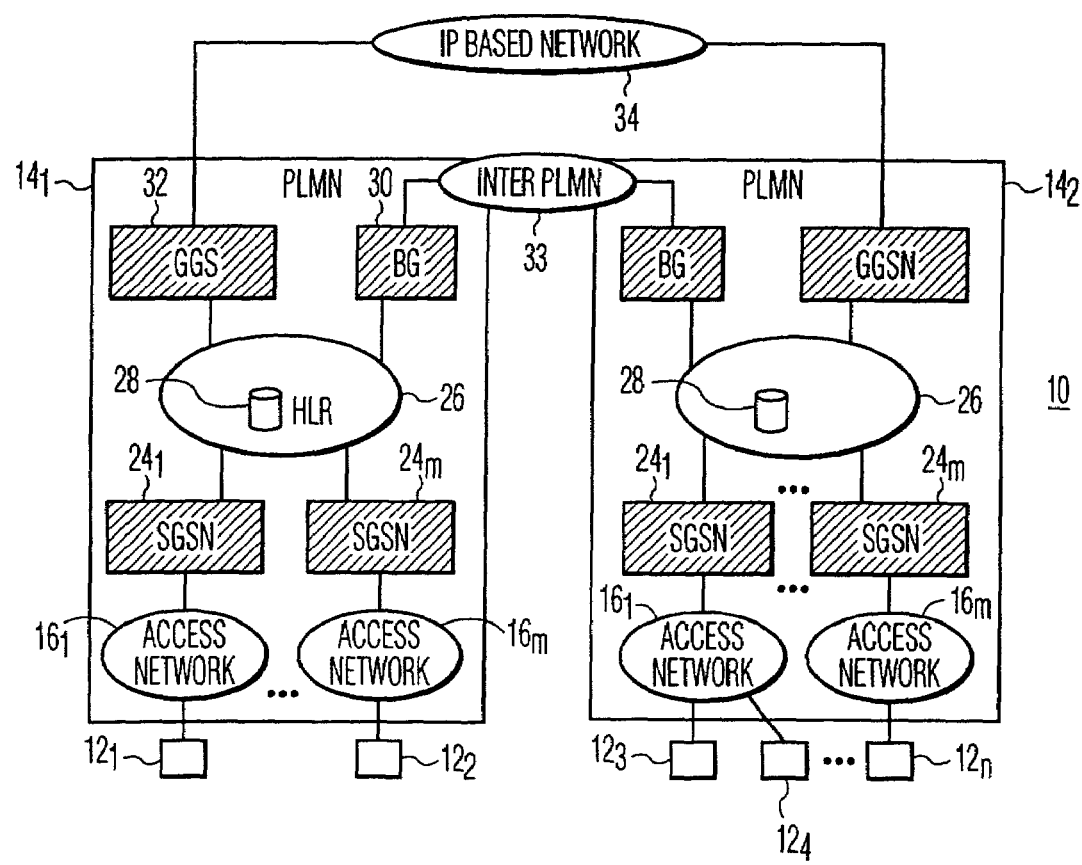
FIG. 1 illustrates a block schematic of a General Packet Radio Service Network architecture according to the prior art.

FIG. 1 depicts a General Radio Packet Service (GPRS) network architecture 10 in accordance with the prior art for providing packet radio service to a plurality of mobile terminals $12_1, 12_2 \ldots 12_n$ (where n is a positive integer). The network architecture 10 of FIG. 1 includes at least one, and preferably, a plurality of packet domains, each represented by a Public Land Mobile Network (PLMN). FIG. 1 illustratively depicts a pair of PLMNs $14_1$ and $14_2$, although it should be understood that the network architecture 10 could include a larger or smaller number of PLMNs. Each PLMN, such as PLMN $14_1$ provides packet radio service within geographic area for which a network operator has regulatory authority. The PLMNs generally have the same architecture and only the details of PLMN $14_1$ are described.

Figure 2:
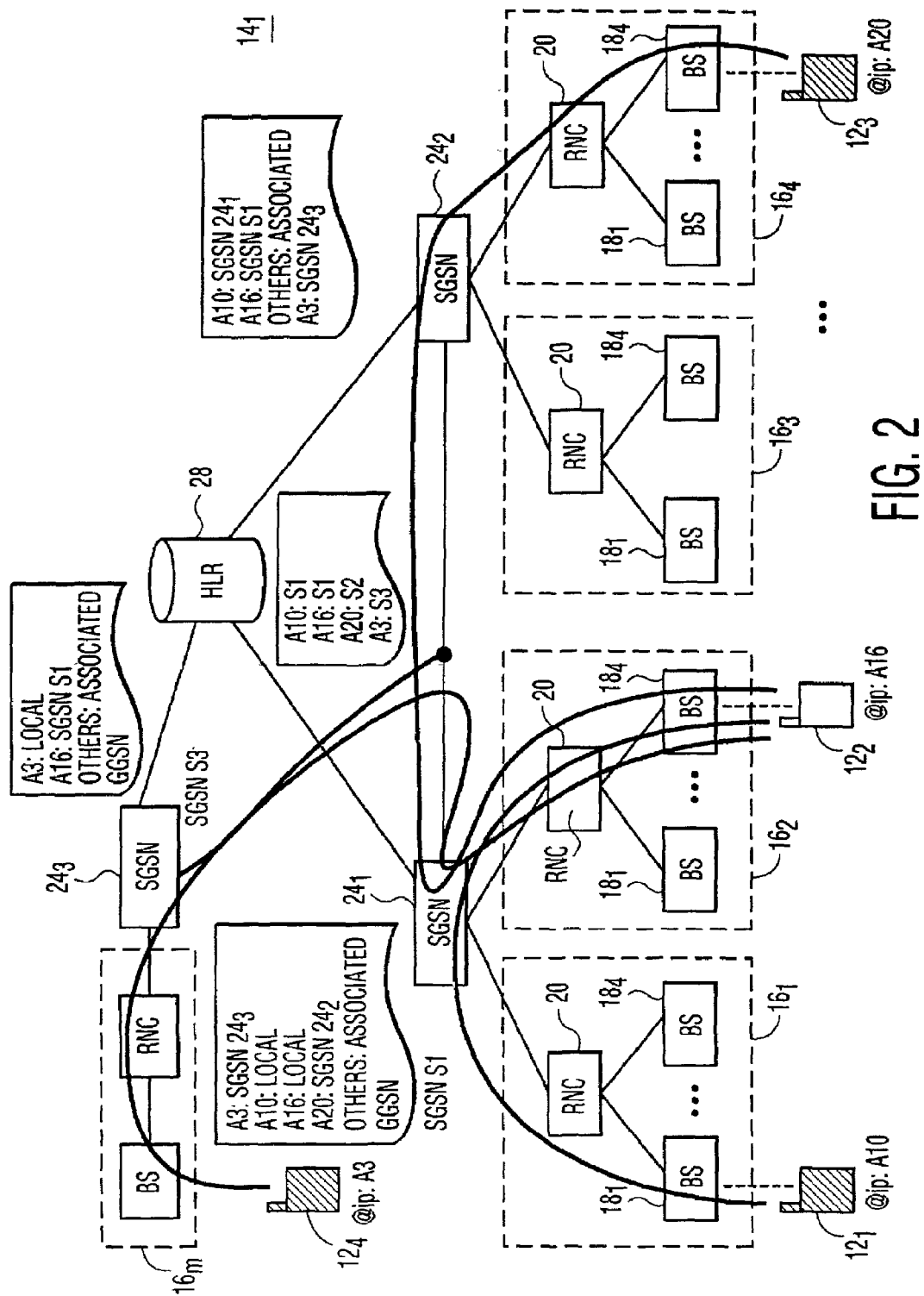
FIG. 2 depicts a portion of the network architecture of FIG. 1 showing the manner in which packet communications occurs among mobile terminal users in accordance with present principles while each user remains associated with a particular access network.
Figure 3:
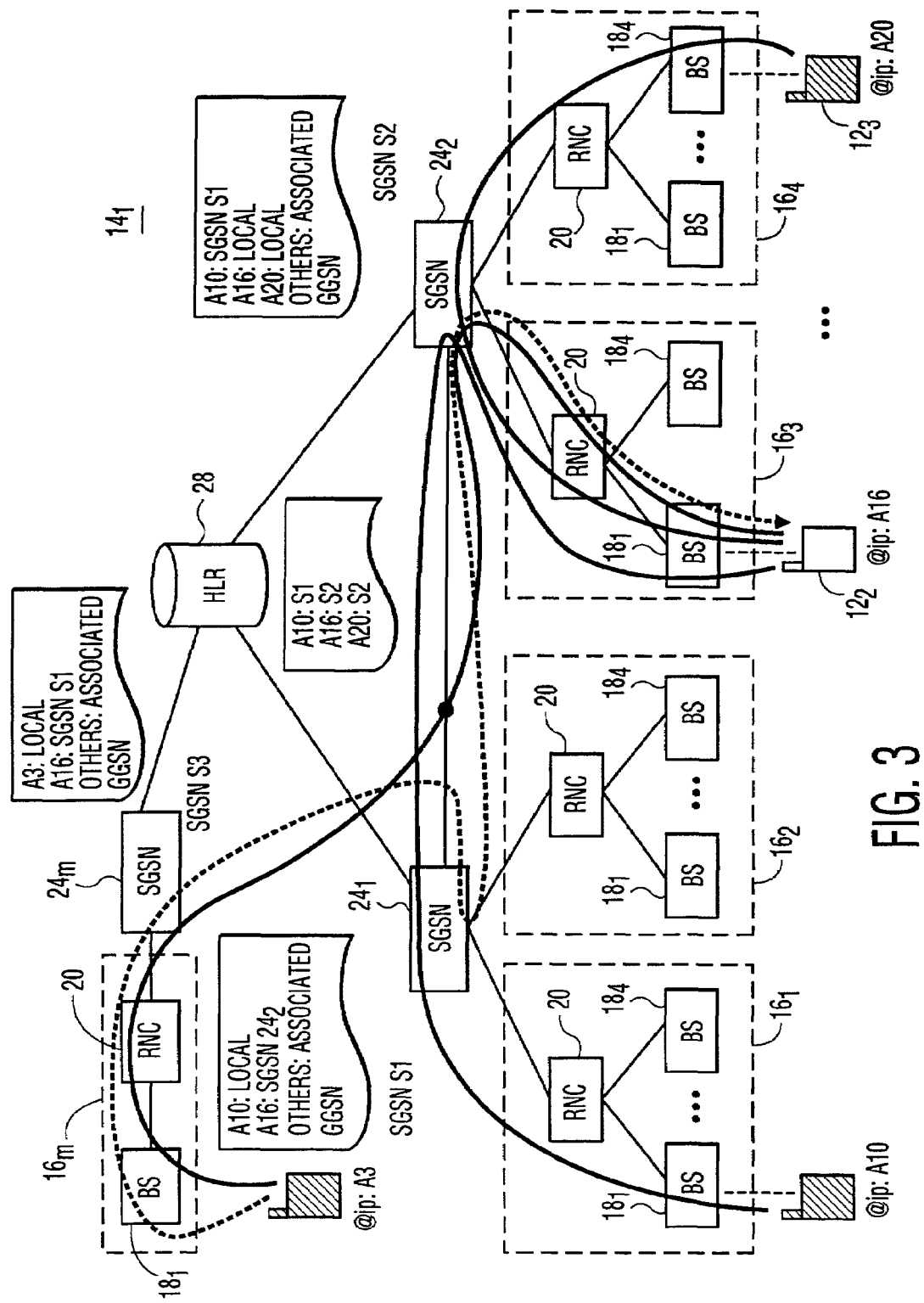
FIG. 3 depicts a portion of the network architecture of FIG. 1 showing the manner in which packet communications occurs among mobile terminal users in accordance with present principles when a user travels from one access network to another in the same packet domain.

In practice, the PLMN $14_1$ includes at least one, and preferably, a plurality of radio access networks $16_1 \ldots 16_m$ (where m is a positive integer). Each radio access network provides access to one or more of the mobile terminal users $12_1$–$12_n$ typically in accordance with one of the GSM/3GPP or the UMTS/3GPP specification. As best seen in FIGS. 2 and 3, each access network includes at least one, and preferably a plurality of base stations $18_1 \ldots 18_x$ (where x is a positive integer). The base stations $18_1$–$18_x$ in each of the radio access networks $16_1$–$16_m$ operate under the control of a radio network controller 20 that serves to manage such functions as call hand-over and base station transmitter power levels.

Within each PLMN, such as PLMN $14_1$ of FIG. 1, each of radio access networks $16_1 \ldots 16_m$, interfaces with a corresponding one of Serving GPRS Service Nodes (SG-SNs) $24_1$–$24_m$. Each SGSN, such as SGSN $24_1$ identifies and authenticates mobile terminal users on a corresponding radio access network, e.g., access network $16_1$ seeking to communicate IP packets. Although FIG. 1 depicts a one-to-one relationship between each radio access network and each SGSN, an SGSN can serve two or more access networks as seen in FIGS. 2 and 3. Since each of the radio access networks $16_1$–$16_m$ serves a particular geographic area, the SGSN associated with that access network likewise serves the same area.

Each of the SGSNs $24_1$–$24_m$ interfaces with a PLMN core 26 that includes a Home Location Register (HLR) 28. The HLR 28 takes the form of a database that stores information about the mobile terminal units that subscribe to the packet radio service offered by the PLMN. In particular, the HLR 28 stores the IP address and corresponding SGSN for each mobile terminal user in the PLMN.

Each PLMN, such as PLMN $14_1$ includes a first gateway 30, typically denominated as a Border Gateway (BG). The BG 30 enables each PLMN to exchange information with other PLMNs via an inter-PLMN network 33. Such information includes the identity of "visiting" mobile terminal users, i.e., mobile terminal users originally homed to one PLMN but roaming in another PLMN. Further, each PLMN also includes a second gateway, denominated as a Gateway GPRS Support Node (GGSN) 32 that interfaces the PLMN to an external IP network 34, typically, although not necessarily, the Internet. The GGSN 32 serves to route packets between a mobile terminal user and the external IP network, or a destination beyond the PLMN, such as a mobile terminal user attached to a different network.

A mobile terminal user, e.g., user $12_1$ first seeking service from its home PLMN, e.g., PLMN $14_1$ does so by "attaching" itself via the following process. First, the mobile terminal user accesses the PLMN $14_1$ via a radio access network, e.g., access network $16_1$. Thereafter, the SGSN (e.g., SGSN $24_1$) serving the requesting mobile terminal user identifies and authenticates the user. Once identified and authenticated, the requesting mobile terminal user establishes a packet data protocol (PDP) communication session, herein after referred to as a "PDP context" in order to receive a dynamic IP address. To establish a PDP context, the requesting mobile terminal user makes a PDP context request. The SGSN receives the request and, in turn, allocates the appropriate radio resources within the corresponding radio access network in accordance with the Quality of Service (QoS) requirement embodied in the PDP context request.

The SGSN forwards the PDP context request to the GGSN 32. In response, the GGSN 32 assigns a dynamic IP address to the requesting mobile terminal user $12_1$ as part of the PDP context response. To the extent that the mobile terminal user seeks access to the Internet 32 the GGSN 32 will reserve the necessary resource and perform any needed authentication. If the mobile terminal has a static IP address, the PDP context request made by the mobile terminal user will incorporate that information in the appropriate field in the PDP context request received by the GGSN 32. Otherwise, the IP request field remains empty. Once the mobile terminal user obtains an IP address in this fashion, the user retains that address while attached to its home PLMN for service.

Under the currently proposed GPRS standard, a mobile terminal user, e.g., user $12_1$ seeking to exchange IP packets with another user (e.g., user $12_2$) must always establish a communications path through the corresponding SGSN to the GGSN 32 within the sender's PLMN even if the sender does not seek access to the external IP network 34. In other words, the GGSN 32 within the PLMN receives all packet traffic, even the packet traffic exchanged between mobile terminal users in the same network, thus placing a burden on the GGSN 32.

In accordance with present principles, the SGSNs $24_1$–$24_m$ within a PLMN, such as the PLMN $14_1$ of FIG. 2 advantageously route packets among the mobile terminal users served by that PLMN without the intervention of the GGSN (not shown in FIG. 2). The SGSNs within the PLMN $14_1$ accomplish such routing by maintaining in each SGSN a routing table containing information about the mobile terminal users. Upon creation of a PDP context for a mobile terminal user, the SGSN serving that mobile terminal user will update its routing table and will designate the mobile terminal user as "local" (i.e., served by that SGSN.) Similarly, the SGSN likewise updates its routing table when a mobile terminal user drops its PDP context. Using its internal routing table, each SGSN determines whether an incoming packet is destined for a mobile terminal user served by that SGSN, or is destined for another SGSN in the same PLMN (e.g., PLMN $14_1$) or a destination beyond the PLMN.

To facilitate routing by the SGSNs, the HLR 28 in the PLMN receives updates from each SGSN concerning the IP address of each "local" mobile terminal user, i.e., the mobile terminal users currently homed to the PLMN as well as the identity of the SGSN serving that user. In this way, if an SGSN receives an incoming packet for which no information exists in the routing table, the SGSN can query the HLR 28 for information. Since the HLR 28 itself undergoes updating by a reporting SGSN each time a new mobile terminal user attaches itself to the PLMN $14_1$ an SGSN, upon querying the HLR, will obtain the most current data. Table I below depicts such an exemplary data record in the HLR 28.

TABLE I

| Mobile Terminal User | IP Address | SGSN |
|---|---|---|
| $12_1$ | A10 | $24_1$ |
| $12_2$ | A16 | $24_1$ |
| $12_3$ | A20 | $24_2$ |
| $12_4$ | A3 | $24_3$ |

In operation, when a mobile terminal user seeks to exchange packets with another mobile terminal user, the SGSN associated with the sending mobile terminal user examines the destination IP address in the packet received from the sending user. Thus, when the mobile terminal user $12_1$ sends a packet destined for the mobile terminal user $12_2$, the SGSN $24_1$ examines the destination IP address (@ip: A16) in the received packet destined for that mobile terminal user. In the embodiment of FIG. 2, the SGSN $24_1$ knows that mobile terminal users $12_1$ and $12_2$ are "local", (i.e., served by the SGSN $24_1$). Knowing that mobile terminal $12_2$ is local, the SGSN $24_1$ can route packets thereto from the mobile terminal user $12_1$ without involvement of the GGSN (not shown).

From the information contained in its internal routing table, the SGSN $24_1$ can also route IP packets to mobile terminal users served by other SGSNs. In FIG. 2, the SGSN $24_1$ knows that SGSNs $24_2$ and $24_3$ serve mobile terminal users $12_3$ and $12_4$, respectively. Thus, the SGSN $24_1$ can route IP packets destined for mobile terminal user $12_3$ to the SGSN $24_3$ for routing to that mobile terminal user. Only when the IP address in the packet specifies a destination outside the PLMN $14_1$ does the SGSN $24_1$ route the packet to the GGSN (not shown in FIG. 2). The other SGSNs in the PLMN $14_1$ likewise use their internal routing tables to route traffic sent from the mobile terminal users they serve. Thus, for example, each of the SGSNs $24_2$ and $24_3$ can route IP packets from a corresponding one of mobile terminal users $12_3$ and $12_4$, respectively, by examining the destination IP address in the transmitted packet. Using information in its internal routing, each SGSN establishes the appropriate path to route the packet to its intended destination. As with the SGSN $24_1$, the other SGSNs (e.g., SGSN $24_2$ and $24_3$) in the PLMN $14_1$ only route IP packets to the GGSN when the destination IP address in such packets corresponds to a destination outside the PLMN.

In practice, each SGSN in each PLMN updates its routing table in following manner to assure continued routing capability. Should a SGSN receive a packet for which the destination IP address does not exist in its internal routing table and does not correspond to a GPRS network address, then the SGSN identifies the SGSN homed to the destination mobile terminal and determines the IP address of the destination mobile terminal as well as the identity of the SGSN to which the mobile terminal user is currently attached if different. To the extent necessary, the SGSN will query the HLR 28 for such information.

If an SGSN receives a packet for which the destination IP address corresponds to an entry in the table but for which the source address does not correspond to an entry then the SGSN creates a new entry for that source address and its associated SGSN. Again, to the extent necessary, the SGSN will query the HLR 28 for such information. Should a mobile terminal user detach itself from the PLMN (i.e., the mobile terminal user drops its PDP context), the SGSN updates its routing table by dropping the corresponding entry for that mobile terminal user. If an SGSN receives a packet for which the source IP address corresponds to an entry in the table but for which the SGSN does not associate itself as being attached to the sending mobile terminal user, the SGSN updates its routing table accordingly.

During travel, a mobile terminal user can enter or leave a geographic area associated with a particular SGSN. For example, the mobile terminal user $12_2$ can enter an area served by SGSN $24_2$ as depicted in FIG. 3, after leaving an area served by the SGSN $24_1$ as depicted in FIG. 2. To enable the "new" SGSN to route traffic to and from this "newly" attached mobile user, the new SGSN will contact the "old" SGSN for the context information for the newly attached mobile terminal. As depicted FIG. 3, the SGSN $24_2$ upon detecting the presence of the mobile terminal user $12_2$ in its serving area then contacts the SGSN $24_1$ for the PDP context information associated with this newly attached mobile terminal user. The old and new SGSNs update their respective routing tables to reflect the new location of the mobile terminal user $12_2$. After updating, the new SGSN $24_2$ can now route IP packets sent from and destined for the mobile terminal user $12_2$. Note that when an SGSN, such as SGSN $24_2$ detects the presence of a new mobile terminal user (e.g., mobile terminal user $12_2$, that SGSN can update other SGSNs before they would otherwise become aware of the new attachment of that mobile terminal user.

After each of the old and new SGSNs update their respective routing tables, each SGSN will typically update the HLR 28. With the HLR 28 now updated, then any SGSN in the network $14_1$ can query the HLR to obtain routing information to send packets to the mobile terminal user $12_2$ directly (i.e., through SGSN $24_2$), rather that needing to first send the IP packet to the old SGSN $24_1$ for forwarding. Once an SGSN receives a packet from the mobile terminal user $12_2$ after that user has become attached to the SGSN $24_2$ the recipient SGSN update its own internal routing table, and thus will know where to direct packets destined for the mobile terminal user $12_2$.

In practice, SGSNs do not retain routing information indefinitely. Given that the mobile terminal users $12_1$–$12_n$ often travel within the PLMN $14_1$ and even to different PLMNs, the routing information stored within a given SGSN can become "stale" over time. For that reason, each SGSN will typically discard routing information after a prescribed interval, starting with the oldest entries first. The length of time during which an SGSN retains routing entries depends on a variety of factors, including the number of mobile terminal users currently attached to an SGSN as well as the volume of packets transmissions.

The foregoing describes a technique for routing IP packets among mobile terminal users in a General Packet Radio Service (GPRS) network by having the Serving GPRS Service Nodes examine the destination IP address in each incoming packet and, if destined for another mobile terminal user in the same PLMN, then route the packet accordingly.

The invention claimed is:

1. A method for communicating at least one data packet among mobile terminal users served by a General Packet Radio Service Network having at least one source service node for managing at least one radio access network and performing identification and authentication of mobile terminal users on the radio access network served by the source service node and a gateway node for establishing a packet data protocol (PDP)context with the mobile terminal user upon initial attachment, and for establishing a communications path between the mobile terminal user and an external network, comprising the steps of:

identifying and authenticating the mobile terminal user at the source service node in the network;

caching at the source service node in the network a packet from the mobile terminal user, the packet having a destination IP address;

checking at the source service node whether the destination IP address of the packet identifies any mobile terminal users served by each radio access network managed by the source service node in accordance with the PDP context assigned upon initial attachment, and if so, routing the packet to a destination mobile terminal user identified by the destination IP address in the packet, otherwise routing the packet to a gateway when the destination IP address identifies an external destination destined to receive the packet, wherein the checking step includes querying a routing table maintained by the source service node that lists mobile terminal users and their corresponding IP addresses.

2. The method according to claim 1 further including the step of updating the source service node each time a new mobile terminal user attaches itself to the network.

3. The method according to claim 1 wherein the source service node discards routing information in its routing table after a prescribed interval.

4. The method according to claim 1 wherein the source service node updates its routing table by querying the home location register in the network when the source service node lacks knowledge of whether the destination IP address lies within the network.

5. The method according to claim 4 wherein the source service node dynamically updates the home location register with dynamically allocated IP address information each time a new mobile terminal user attaches itself to the service node.

6. The method according to claim 1 further including the steps of:
    determining at the source service node whether the mobile terminal user whose packet the service node had cached no longer remains associated with that service node, and if so,
    updating an internal routing table maintained by the source service node to reflect that the mobile terminal user no longer remains associated with that node.

7. The method according to claim 6 wherein the source service node alerts at least a second service node in the network that the mobile terminal is no longer associated with the first service node.

8. The method according to claim 6 wherein the source service node alerts at least a second service node in the network when a new mobile terminal user has become attached to the source service node.

9. The method according to claim 1 wherein the routing step includes the step of routing the packet to a destination service node to which the destination mobile terminal user is attached.

10. The method according to claim 9 wherein the packet is temporarily routed by the source service node to the destination service node even after the destination mobile terminal user has detached itself from the destination service node and attached itself to a new destination service node, such temporary routing continuing until the new destination service node notifies the source service node of a new routing path.

11. A General Packet Radio Service Network, comprising:
    at least one radio access network for radio access to mobile terminal users;
    at least one source service node for: (1) managing the at least one radio access network, (2) performing identification and authentication of mobile terminal users on the at least one radio access network, (3) caching a packet from the mobile terminal user having a destination IP address; (4) determining whether the destination IP address of the packet identifies a particular mobile terminal users served the at least one radio access network managed by the source service node in accordance with a PDP context assigned upon initial attachment and if so, (5) routing the packet to the particular mobile terminal user identified by the destination IP address in the packet, and
    a gateway node for establishing the packet data protocol (PDP) context with the mobile terminal user upon initial attachment, and for establishing a communications path between the mobile terminal user and an external network, and for routing the packet to the external network when the destination IP address identifies the external network as the destination destined for that wherein said determining includes querying a routing table maintained by the source service node that lists mobile terminal users and their corresponding IP addresses.

* * * * *